March 23, 1965 J. S. VAUGHN 3,174,559
TORQUE CONTROL MECHANISM FOR IMPACT TOOLS
Filed June 20, 1963 7 Sheets-Sheet 1

INVENTOR.
JACK S. VAUGHN
BY
Arthur Frederick
ATTORNEY

March 23, 1965   J. S. VAUGHN   3,174,559
TORQUE CONTROL MECHANISM FOR IMPACT TOOLS
Filed June 20, 1963   7 Sheets-Sheet 2

INVENTOR.
JACK S. VAUGHN
BY
ATTORNEY

March 23, 1965    J. S. VAUGHN    3,174,559
TORQUE CONTROL MECHANISM FOR IMPACT TOOLS
Filed June 20, 1963    7 Sheets-Sheet 3

INVENTOR.
JACK S. VAUGHN
BY
*Arthur Frederick*
ATTORNEY

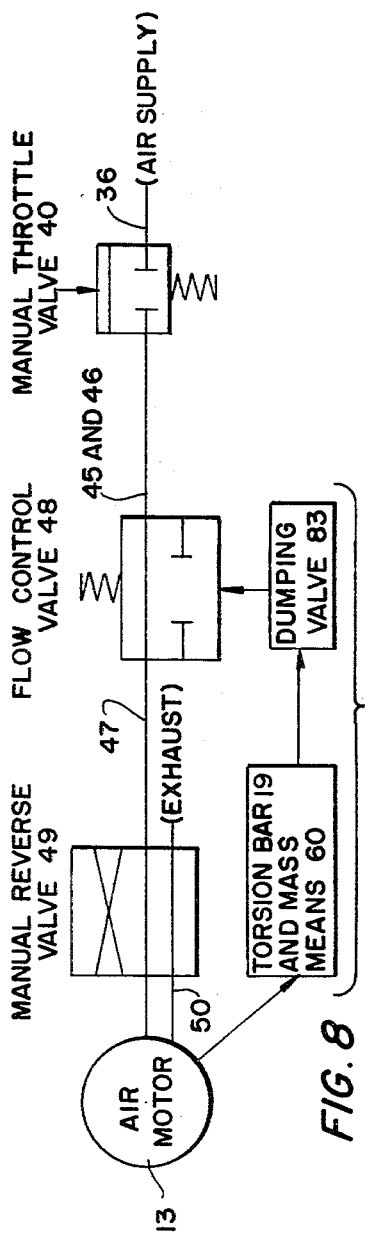
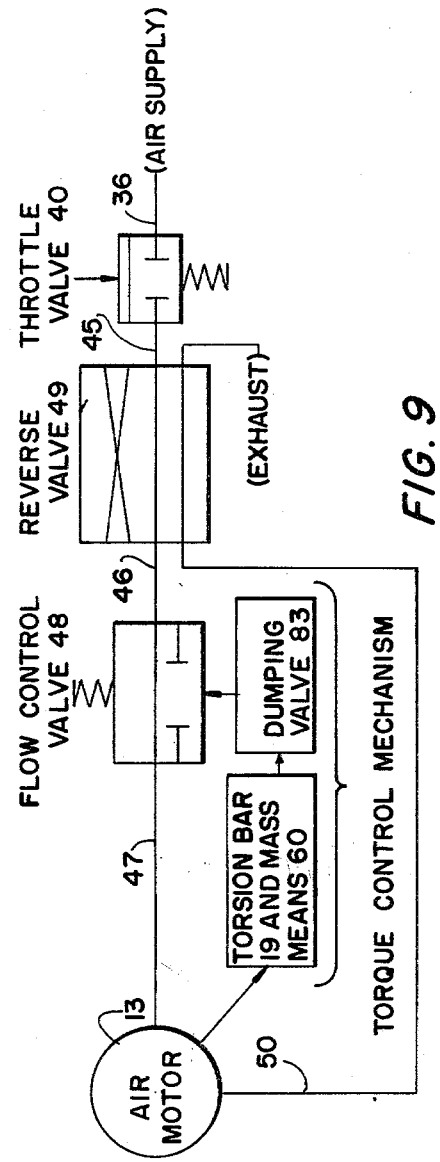

INVENTOR.
JACK S. VAUGHN

INVENTOR.
JACK S. VAUGHN

March 23, 1965     J. S. VAUGHN     3,174,559

TORQUE CONTROL MECHANISM FOR IMPACT TOOLS

Filed June 20, 1963     7 Sheets-Sheet 7

INVENTOR.
JACK S. VAUGHN
BY
ATTORNEY

United States Patent Office 3,174,559
Patented Mar. 23, 1965

3,174,559
TORQUE CONTROL MECHANISM FOR
IMPACT TOOLS
Jack S. Vaughn, Sayre, Pa., assignor to Ingersoll-Rand
Company, New York, N.Y., a corporation of New
Jersey
Filed June 20, 1963, Ser. No. 289,243
12 Claims. (Cl. 173—12)

This invention relates to power tools and more particularly to a torque control mechanism for an impact tool, which mechanism measures torque load and automatically effects cessation of operation of the motor means of the impact tool upon a predetermined torque load.

Heretofore, many different torque control mechanisms and devices have been devised to sense or measure torque loads imposed on an impact tool and, upon a predetermined torque load, cause the motor to cease operating. One such torque control mechanism is exemplified in the U.S. Patent to Harrison et al., No. 3,006,446, which torque control mechanism employs a prestressed torsion bar connected to the anvil and the workpiece. One of the disadvantages of this mechanism is the length which the mechanism adds to the overall length of the impact tool, thereby reducing the utility and handling ease of the impact tool. Another type of torque control mechanism is illustrated in the patent to Amtsberg, No. 2,768,546, which mechanism comprises an inertia element connected for conjoined rotation with the rotor of the motor and cooperates with another element to move the latter axially upon a predetermined torque load. This torque control mechanism measures or senses the rate of deceleration of the hammer and motor upon impact. The disadvantage of this mechanism is that it cannot be adjusted for narrow increments of torque load. Other known torque control mechanisms for impact tools have not proven satisfactory for a wide variety of reasons other than mentioned above, such as inconsistent or inaccurate operation, complex construction, and/or relatively short operative life.

It is, therefore, an object of the present invention to provide a torque control mechanism for an impact tool, which mechanism is capable of adjustment to narrower increments of torque load than heretofore known torque control devices.

Another object of this invention is to provide a torque control mechanism for an impact tool, which mechanism is of simple construction and does not appreciably add to the size or weight of the impact tool.

It is a further object of the present invention to provide a torque control mechanism capable of accurate sensing of torque load.

In accordance with the foregoing objects, the invention contemplates a torque control mechanism for an impact tool, such as an impact wrench, which has a motor connected to drive a hammer assembly constructed and arranged to deliver intermittent rotary impacts to an anvil. The anvil is connected to a work engaging element or workpiece to transmit rotary impacts to the latter.

The torque control mechanism comprises a torsion means which may be in the form of a torsion bar or rod disposed within an axial bore formed in the motor rotor. One end of the torsion means is connected for conjoined rotation with the hammer assembly, while the opposite end is free to rotate relative to the hammer assembly. A mass means comprising a cam disc and an inertia disc or flywheel is connected to the rotatively free end of the torsion means through the cam disc which is secured to that end of the torsion bar. The mass means is constructed and arranged so that the inertia disc rotates with the cam disc in one direction and is free to rotate relative to the cam disc in the opposite direction and, upon relative rotation, axially moves relative to the cam disc. The cam disc is biased against axial movement by a biasing means, such as a spring, which is adjustable for various selected torque loads. A control means is provided which is operatively associated with the mass means so that, upon sufficient axial movement of the cam disc against the resistance of the biasing means, the cam disc effects actuation of the control means to cause cessation of operation of the motor.

In operation of the impact tool, the torque control mechanism functions as follows: Upon impact of the hammer assembly against the anvil and the consequent deceleration of the hammer assembly, the mass means continues to rotate by reason of its inertia of rotation and causes the torsion means to twist, which twisting action has the effect of accumulating or storing energy. The mass means will continue to rotate until the inertial force is absorbed in the torsion means. At this time the stored energy is released to effect untwisting of the torsion means and thereby cause the mass means to rotate in the opposite direction along with the free end of the torsion means. When the stored energy is dissipated, the inertia of rotation imparted to the inertia disc of the mass means causes the inertia disc to override or rotate relative to the cam disc and thereby cause the latter to move axially against the resistance of the biasing means. Since the rate of deceleration of the hammer assembly upon impact is proportional to the torque load imposed by the fastener on the anvil through the workpiece and the amount of energy stored in the torsion means is directly proportional to the rate of deceleration of the hammer assembly, the amount of axial movement of the inertia disc is proportional to the rate of deceleration of the hammer. Therefore, when the predetermined torque is reached, sufficient movement of the inertia disc will occur to effect actuation of the control means and cessation of operation of the motor.

The torsion means, while functioning to store energy which is directly proportional to the rate of deceleration of the hammer, has the effect of amplifying the inertial force imposed on the mass means and thereby enables the torque control mechanism to be adjusted to narrower increments of torque loads than heretofore known torque control mechanisms.

The invention will be more fully understood from the following description thereof when considered in connection with the accompanying drawings wherein two embodiments of the invention are illustrated by way of example and in which:

FIG. 8 is a diagrammatic drawing of the motive fluid system for the impact tool according to this invention;

FIG. 9 is a diagrammatic drawing of a modified motive fluid system;

Figures 1, 2:
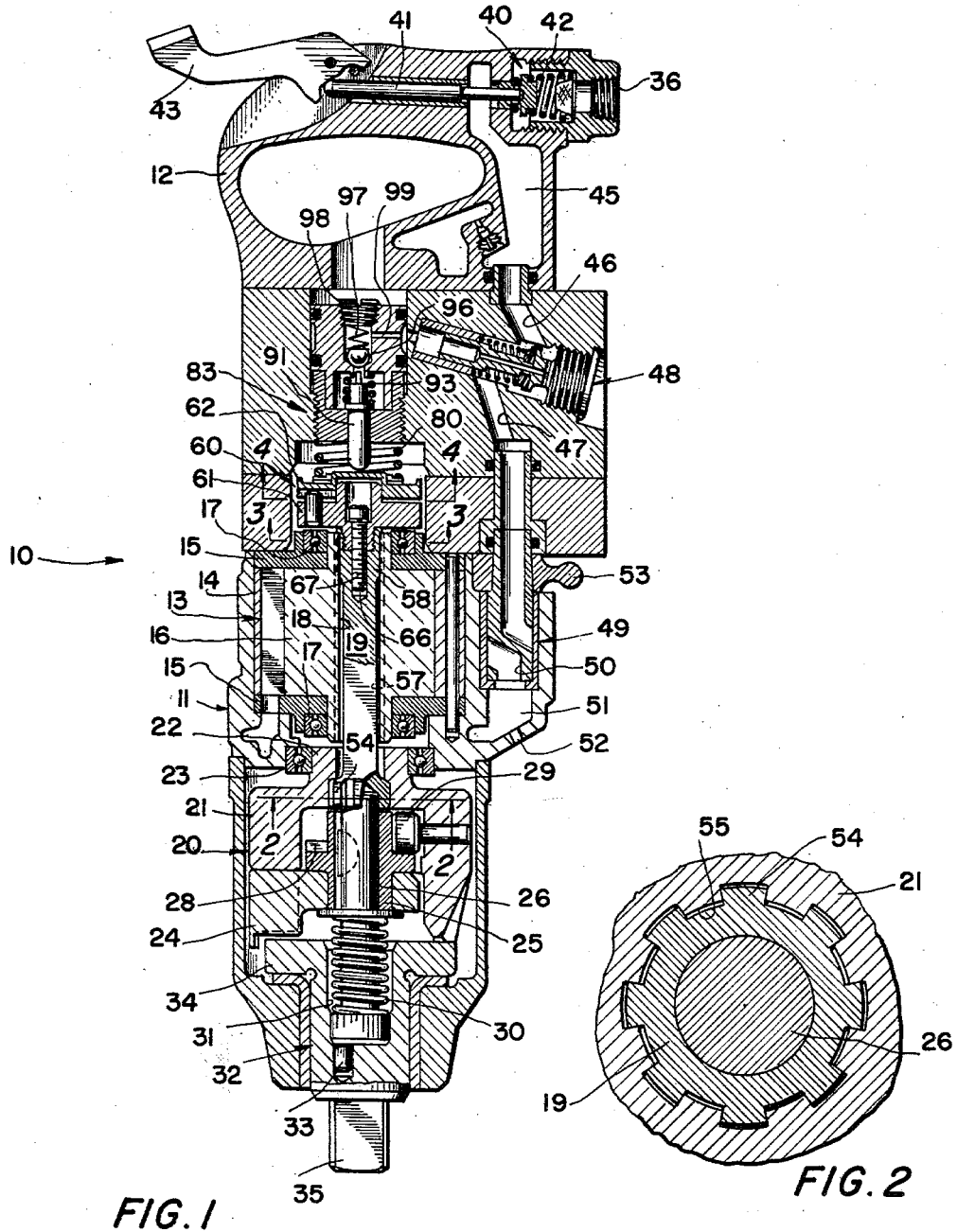
FIG. 1 is a sectional view of an impact tool incorporating a torque control mechanism according to one embodiment of the invention.
FIG. 2 is a view in section taken along line 2—2 of FIG. 1, somewhat enlarged.

Referring now to the drawings and more particularly to FIG. 1, the reference numeral 10 generally designates an impact wrench power tool according to one embodiment of this invention. The impact wrench power tool comprises a casing or housing 11 which, for convenience of fabrication and assembly, is shown as consisting of four sections and a handle section 12 suitably joined together by means (not shown).

Fluid motor

A fluid motor 13, such as an air motor, is disposed in the housing. The air motor 13 comprises a cylindrical casing 14 closed at opposite ends by end walls 15 to form a working chamber. A rotor 16, carrying radially slidable vanes, is rotatably supported in the working chamber by bearings 17 in end walls 15. The motor is provided with suitable porting (not shown) for admitting pressurized fluid into the working chamber and exhausting spent pressurized fluid to atmosphere. The rotor 16 is provided with an axial bore 18 which is adapted to receive therethrough a torsion means, herein illustrated as a torsion bar 19, which forms part of a torque control mechanism hereinafter more fully described.

Hammer assembly

A hammer assembly 20 is disposed in housing 11 adjacent motor 13. The hammer assembly 20 may be of any suitable construction and, for illustrative purposes, is shown as a cam engaged-spring disengaged type. The hammer assembly is fully disclosed in my co-pending U.S. patent application, Serial No. 204,461, filed June 22, 1962, and, therefore, will not be described in detail. The hammer assembly 20 shown in FIG. 1 comprises a hammer 21 open at its forward end and closed at its rearward end by a wall carrying a boss 22 journaled in bearings 23 mounted in housing 11. The hammer 21 is provided with a plurality of notches or slots, each of which slidably receives the hammer jaws of hammer dog 24 so that the hammer 21 rotatively carries the hammer dog 24 and the latter is free to move axially relative to the hammer. The hammer dog 24 is disposed on a tubular cam member 25 so as to be rotatable relative to the latter and carried axially by the tubular cam member upon axial movement thereof. The tubular cam member 25 is secured at the rearward end portion of a spindle 26 by a key which extends into a longitudinal slot in the cam member so that the latter is connected for conjoined rotation with spindle 26, but is axially movable relative to the spindle. Alternatively, tubular cam member 25 may be spline connected to spindle 26. The cam member has a cam lobe 28 which is disposed so as to be periodically engaged by a cam follower 29 rotationally carried by hammer 21. The cam member 25 is biased by a spring 30 in a rearward or hammer dog disengaged position. The spring 30 is disposed around the forward end of spindle 26, which end extends into an axial recess 31 formed in the rearward end portion of an anvil 32. Spindle 26 is secured to anvil 32 for conjoined rotation with the latter by a pin 33.

Anvil 32 is supported for rotation in the forward end portion of housing 11 and is provided with anvil jaws 34 corresponding in number to the number of hammer jaws of hammer dog 24. The forward end portion of anvil 32 is provided with a square end 35 which is adapted to receive a socket or other fastener engaging member (not shown). The anvil 32 and the jaws 34 thereof are arranged in relationship with the hammer assembly 20 such that, when hammer dog 24 is carried forward against the tension of spring 30, the hammer dog jaws come into rotative alignment with the anvil jaws and rotationally impact against the anvil jaws 34 to thereby transmit rotation through the anvil and fastener engaging member (not shown) to a fastener to be turned.

In operation, the rotation of hammer 21 carries cam follower 29 into engagement with cam lobe 28 which forces cam member 25 to move axially against the tension of spring 30. Axial movement of cam member 25 carries hammer dog 24 axially relative to the hammer 21 and into rotative alignment with anvil jaws 34 so that the hammer jaws of hammer dog 24 impact against the anvil jaws. Immediately after impact and the consequent deceleration of the hammer and, if the torque load on the anvil is of sufficient magnitude, the rebound of the hammer, spring 30 returns cam member 25 and hammer dog 24 rearwardly to the disengaged position shown in FIG. 1.

Fluid supply system

To provide for passing pressurized fluid to the motor and the operation thereof, a pressure fluid supply line connection 36 is provided in handle section 12 of housing 11. A throttle valve 40 is disposed in handle section 12, which valve has a stem portion 41 slidably disposed in a bore in the handle section 12. Throttle valve 40 is constantly biased in a closed position by a spring 42 and is actuated to an open position against the force of spring 42 by a trigger 43 pivotally mounted at 44 to engage and axially move valve stem 41. Throttle valve 40 controls flow of pressure fluid into and through a fluid supply passageway 45 formed in handle section 12. Passageway 45 communicates with a passageway 46 which, in turn, communicates with another passageway 47 through a flow control valve 48. Passageway 47 conducts pressurized fluid to motor 13 through a reversing valve 49 and ports (not shown). Pressurized fluid exhausted from motor 13 is discharged to atmosphere through passage 50 in the reversing valve, chamber 51, and a vent port 52 in housing 11. Adjustment of reversing valve 49 is achieved through rotative movement of knob 53.

Torque control mechanism

Figure 3:
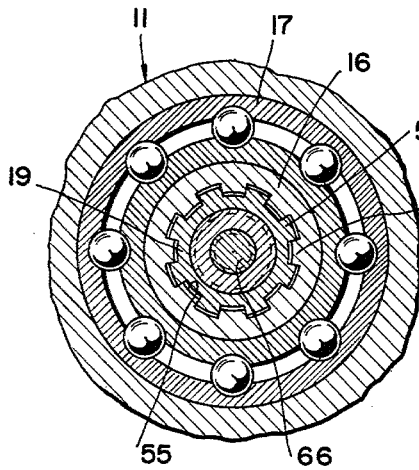
FIG. 3 is a view in section taken along line 3—3 of FIG. 1 on an enlarged scale.
Figure 4:
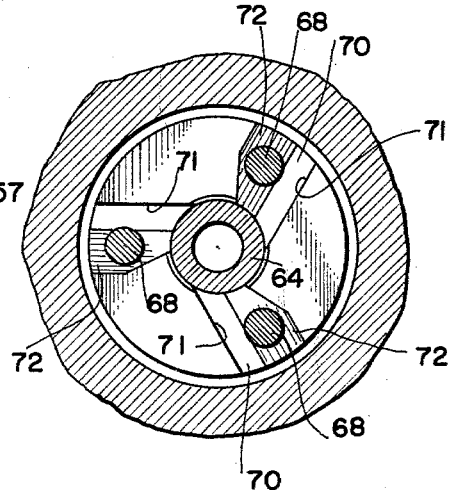
FIG. 4 is a sectional view taken along line 4—4 of FIG. 1.

To provide for automatically ceasing operation of motor 13 when a predetermined torque load is imposed on anvil 32 by a fastener (not shown) which is to be turned, a torque control mechanism is provided. The torque control mechanism includes torsion bar 19 which has a splined forward end portion 54, the splines of which interlock with the splines formed in an axial bore 55 formed in the rear wall of hammer 21. The splined connection between torsion bar 19 and hammer 21 provides for conjoined rotation of the end portion 54 of torsion bar 19 and hammer 21. As best shown in FIG. 3, the rearward end portion 58 of torsion bar 19 is provided with splines 56 which mesh with longitudinal splines 57 formed in the surface of bore 18 of rotor 16.

Figure 5:
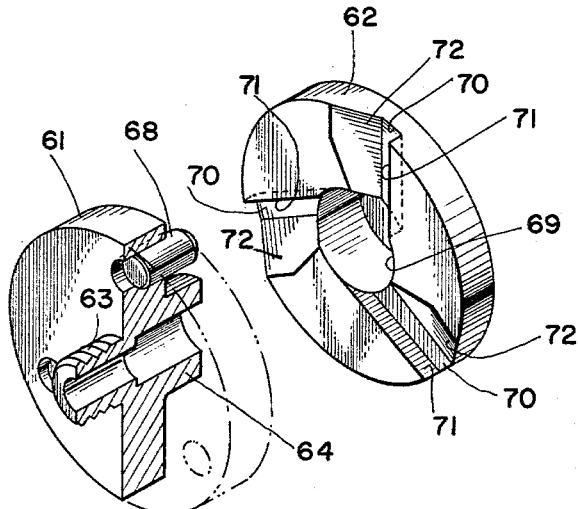
FIG. 5 is an exploded view in perspective of the inertia and cam discs according to this invention.
Figure 6:
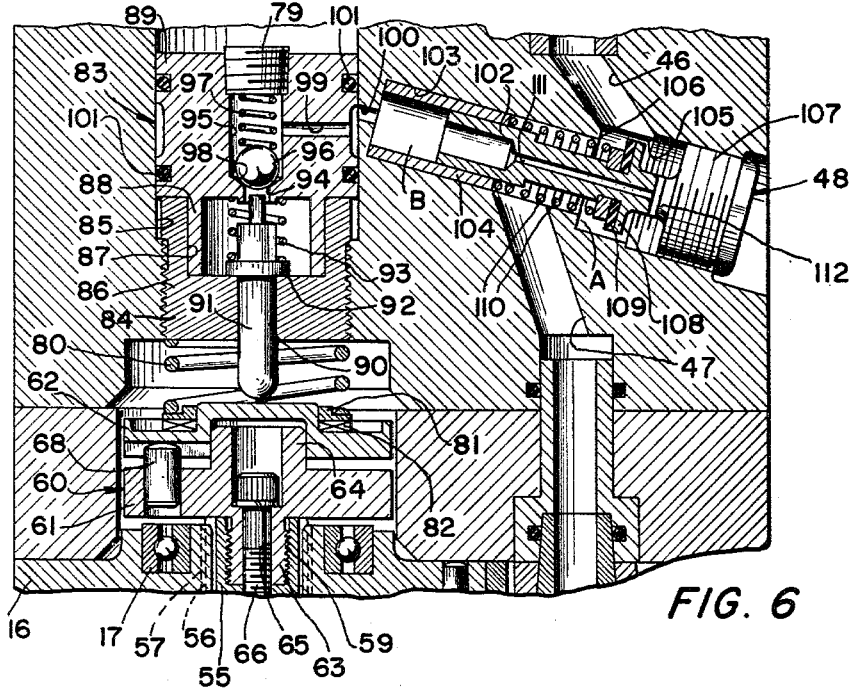
FIG. 6 is a fragmentary view in section showing on an enlarged scale the torque sensing assembly and motor control means.

The torque control mechanism further includes a mass means 60 which comprises a cam disc 61 and an inertia disc 62 disposed in a cavity provided in housing 11 adjacent the rear wall 15 of motor 13. As best shown in FIGS. 5 and 6, cam disc 61 has on one side an axially projecting boss 63 which is threaded to mesh with a threaded axial recess 59 formed in the rearward end portion 58 of torsion bar 19. An axial boss or hub 64, which may be, as shown, of larger diameter than boss 63, is provided on the opposite side of cam disc 61, which hub serves as a support and bearing surface for inertia disc 62. Cam disc 61 has an axial bore 65 to receive a bolt 66 which is turned into a threaded bore 67 in torsion bar 19 to fixedly secure cam disc 61 to torsion bar 19 for conjoined rotation with the latter. A plurality of circumferentially spaced elongated pins 68 are secured to cam disc 61 with the longitudinal axes of the pins extending parallel to the axis of the cam disc. The pins 68 are so positioned that a portion of each pin projects from the rear side or surface of the cam disc.

The inertia disc 62 has a cup-shaped central portion which forms a recess 69 which is dimensioned to slidably receive therein hub 64 of cam disc 61. The forward face or side of inertia disc 62 is provided with a plurality of radially extending grooves 70, corresponding in number to the number of pins 68. Each groove 70 is adapted to receive a pin 68 therein. Each groove 70 has one end wall 71 having a planar surface parallel to the axis of the inertia disc and normal to the forward face of the inertia disc and an opposite end wall 72 having a camming surface inclined and extending at an obtuse angle with respect to the forward face of the inertia disc. When the cam and inertia discs are in the positions as shown in FIGS. 1 and 6, pins 68 project into grooves 70 and engage end walls 72, the force of a spring 80 being sufficient to provide conjoined rotation of inertia disc 62 and cam disc 61. As hereinafter more fully explained, when inertia disc 62 overrides or rotates relative to cam disc 61, pins 68 ride on the camming surface of end wall 72 to thereby force inertia disc 62 to move axially, rearwardly relative to cam disc 61 to the position shown in FIG. 7. Inertia disc 62 is biased in a forward direction toward cam disc 61 by spring 80. The forward end of spring 80 bears against a pressure ring 81 mounted on the outer peripheral surface of the cup-shaped portion of inertia disc 62, while the opposite end of spring 80 bears against a housing of a dumping valve 83. To reduce friction and to prevent twisting of spring 80 upon rotation of inertia disc 62, a needle bearing 82 is interposed between pressure ring 81 and the rear end surface of inertia disc 62.

*Dumping valve*

The dumping valve 83 comprises a two-part valve housing 84 which is secured in a bore 85 extending from the cavity in which the mass means 60 is disposed to atmosphere through handle section 12. One part of valve housing 84 comprises an externally threaded member 86 turned into the threaded forward end portion of bore 85. Threaded member 86 has a recess 87 in the rear end portion thereof into which is secured the tubular extension 88 of the other valve housing part 89. Threaded member 86 is provided with an axial bore 90 extending from recess 87 to the forward end of the threaded member. A plunger 91 is slidably disposed in bore 90 and tubular extension 88 of valve housing part 89. Plunger 91 is provided with an annular flange 92 which limits the plunger's forward movement by abutting the bottom of recess 87. A spring 93 disposed between flange 92 and the end wall of tubular extension 88 biases plunger 91 in a forward position. The rear end portion of plunger 91 is of reduced diameter so as to move axially within an axial bore 94 in valve housing part 89. Plunger 91 is dimensioned in length so that it projects at its forward end beyond threaded member 86 and lies in close spaced relation to the rear end wall of the cup-shaped portion of inertia disc 62. Bore 94 is counterbored at 95 to receive a ball 96 which is biased by a spring 97 in a seated position on a ball seat 98 formed at the juncture of bore 94 and counterbored portion 95. Spring 97 bears at one end against ball 96 and at the other end against a threaded plug 79 secured in the end of counterbored portion 95. Valve housing part 89 is provided with a bleed passageway 99 which communicates at one end with the counterbored portion 95 and at the opposite end with a passage 100, which, in turn, communicates with flow control valve 48. To seal the interstices between the outer surface of valve housing part 89 and the adjacent surface of bore 85, O-ring seals 101 are provided in valve housing part 89 at opposite sides of passage 99.

Dumping valve 83 may be positioned axially in bore 85 by turning threaded housing member 86 on the threaded portion of bore 85. Such adjustment of dumping valve 83 will vary the spaced relationship between the end of plunger 91 and inertia disc 62 to thus vary the torque load at which inertia disc 62 will engage and axially move plunger 91 to cause cessation of operation of motor 13.

*Flow control valve*

Figure 7:
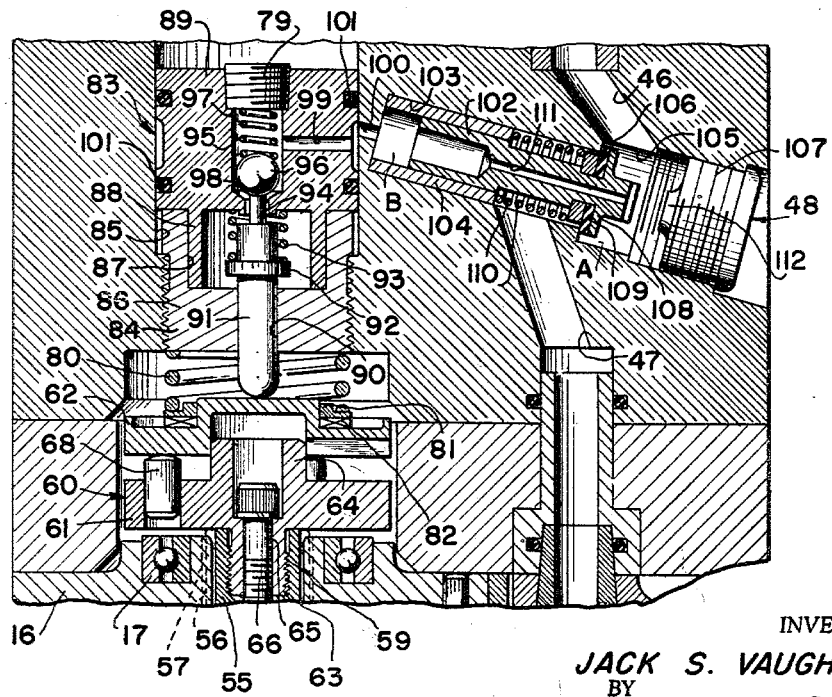
FIG. 7 is a view similar to FIG. 6 showing another operative position of the torque control mechanism.

Flow control valve 48 has a stem portion 102 which is disposed for axial movement in a bore 103 in housing 11, the bore being partly lined by a sleeve 104. Bore 103 is counterbored at 105 so as to provide at the juncture of bore 103 and counterbore 105 a valve seat 106. The outer portion of counterbore 105 is threaded to receive a threaded plug 107. A valve head 108 is formed on the outer end of the throttle valve, which head is provided with a gasket 109 so that when the valve 48 slides to the closed position, as shown in FIG. 7, a tight seal is provided at valve seat 106. Flow control valve 48 is biased in an open position by a spring 110 which is disposed between the outer end of sleeve 104 and head 108. Valve 48 has an axial bore 111 extending therethrough. The outer end of valve 48 is formed to abut against a central boss 112 formed on plug 107 but does not form a seal. Passageway 46 communicates with a chamber A defined between plug 107 and the outer end of sleeve 104 on one side of valve seat 106, while passageway 47 communicates with chamber A on the opposite side of valve seat 106. The inner end portion of valve stem portion 102 defines with the inner end of bore 103 a chamber B.

The above flow control valve functions to control flow of pressure fluid from passageway 46 to passageway 47 through chamber A as follows:

When throttle valve 40 is opened by actuation of trigger 43, the pressurized fluid flows through passageways 45 and 46 into chamber A of flow control valve 48. At this time flow control valve 48 is in the normally open position as shown in FIG. 6. When pressurized fluid enters chamber A, it flows into and through axial bore 111. From bore 111 the pressurized fluid enters chamber B and thereby equalizes the pressure forces acting on valve 48. With valve 48 in the open position, pressurized fluid flows from passageway 46 through chamber A, into passageway 47, and thence through reversing valve 49 to motor 13 to effect operation of the latter. Since the end of valve 48 is provided with a central kerf, chamber B is in communication with chamber A via bore 111 even though in the open position the end of valve 48 seats on boss 112. With valve 48 in the open position, ball 96 of dumping valve 83 is in the seated or closed position. When a predetermined torque load is reached, at which time plunger 91 is axially moved rearwardly by inertia disc 62 so that plunger 91 unseats ball 96, the pressurized fluid is released from chamber B through passageways 100 and 99, counterbored portion 95, and bore 94. This release of pressurized fluid from chamber B provides an imbalance of pressure forces acting on valve 48; and since spring 110 is not of sufficient strength to hold valve 48 in an open position, the pressurized fluid in chamber A acting on valve 48 forces the latter to move to a closed position as shown in FIG. 7. Although chambers A and B are in constant communication, an imbalance of pressure forces acting on valve 48 occurs by reason of the restricted flow of pressure fluids through the kerf in the end of valve 48 and bore 111. In the closed position flow of pressurized fluid from passageway 46 to passageway 47 is stopped, and thus flow of pressurized fluid to motor 13 ceases and the motor stops. After ball 96 of dumping valve 83 reseats and pressurized fluid refills chamber B through bore 111, an imbalance of forces acting on valve 48 continues to exist to hold valve 48 closed. Valve 48 remains closed until throttle valve 40 is allowed to close by release of trigger 43. With throttle valve 40 closed, the fluid pressure in chambers A and B bleeds down fairly rapidly so that spring 110 is allowed to force flow control valve 48 to the open position and thereby reset the impact tool 10 once again in a condition for operation.

*Operation of impact tool*

In operation of impact tool 10 described above, actuation of trigger 43 to open throttle valve 40 permits pressurized fluid to flow, as previously described, to motor 13. Assuming reversing valve 49 is positioned so as to provide clockwise rotation of motor 13, as viewed from the rear of the impact tool, rotor 16 will rotate in a clockwise direction. Clockwise rotation of rotor 16 is transmitted to torsion bar 19 at the rearward end portion 58 of the torsion bar through meshing splines 56 and 57 on the torsion bar and in the bore 18 of the rotor, respectively. Clockwise rotation of the torsion bar is transmitted to hammer 21 by way of the splined interconnection between the forward end portion 54 of the torsion bar and hammer 21. As previously described, rotation of hammer 21 provides intermittent rotary impacts to be delivered by hammer dog 24 against jaws 34 of anvil 32 to effect rotation of the latter. Simultaneous with rotation of hammer 21, torsion bar 19 rotates mass means 60 in a clockwise direction. In the clockwise direction of rotation of motor 13, pins 68 carried on cam disc 61 engage the inclined walls 72 of grooves 70 in inertia disc 62, but the degree of inclination of walls 72 and the force of spring 80, in relation to the inertial torque force, are such that relative rotation of inertia disc 62 with respect to cam disc 61 will not occur and inertia disc 62 is rotatively carried by the cam disc. When the torque load on anvil 32 reaches a magnitude where the hammer 21, upon impact, will appreciably decelerate, mass means 60 and the motor will override the hammer or rotate relative to the hammer. This relative rotation will cause the torsion bar to twist. While the hammer dog 24 of hammer 21 is in engagement, torsion bar 19 will untwist, stalling the motor and causing mass means 60 and motor 13 to rotate in a counterclockwise direction. During untwisting and acceleration of mass means 60 in a counterclockwise direction, the force of spring 80 urging inertia disc 62 in contact with pins 68 carried by the cam disc and the abutment of pins 68 against the vertical walls 71 of inertia disc 62 provide sufficient resistance between the cam disc and inertia disc so that no relative rotation will occur between the two discs. However, when the torsion bar has untwisted and again rotates in a clockwise direction under the driving force of the motor, the rotational inertia of inertia disc 62 causes it to continue to rotate in a counterclockwise direction so that relative rotation between cam disc 61 and inertia disc 62 occurs. Upon relative rotation of inertia disc 62 with respect to cam disc 61, pins 68 of cam disc 61 ride on the inclined end walls 72 of grooves 70 in inertia disc 62 to thereby force inertia disc 62 to move axially rearwardly against the force of spring 80. If the torque load, as reflected in the rate of deceleration of hammer 21, is below the predetermined torque load for which the torque control mechanism of this invention is set by axial positioning of dumping valve 83 in bore 85, pins 68 will only ride part way on the inclined end walls 72 of grooves 70; and the consequent axial movement of inertia disc 62 will not be sufficient to move plunger 91 of dumping valve 83 and cause flow control valve 48 to close and cease operation of motor 13.

When the torque load of a predetermined value is imposed on the anvil and upon impact, the hammer 21 decelerates and rebounds to twist torsion bar 19 sufficiently so that inertia disc 62 is rotationally accelerated by the untwisting of torsion bar 19 and will sufficiently override cam disc 61 to cause pins 68 to ride out of grooves 70 in inertia disc 62. At this time the inertia disc will be forced axially rearwardly a sufficient distance to engage the end of plunger 91 of the dumping valve 83 and axially move the latter to unseat ball 96 to cause flow control valve 48 to close as previously described.

The above described impact tool 10 as illustrated in FIG. 1 and schematically shown in FIG. 8 is not operative in the reverse rotation of motor 13 under torque loads below the selected predetermined values because, upon deceleration of the hammer and twisting of torsion bar 19, inertia disc 62, at the beginning of the untwisting of the torsion bar, will override cam disc 61 and will be axially forced rearwardly to actuate dumping valve 83 which, in turn, will cause flow control valve 48 to close and cease operation of motor 13. To overcome this short-coming of the above described impact tool, the major components of the impact tool may be arranged as diagrammatically shown in FIG. 9. In the arrangement shown in FIG. 9, reversing valve 49 is disposed upstream of the flow control valve 48 with respect to the flow of pressurized fluid to motor 13 so that, upon reversing the reversing valve 49, the pressurized fluid by-passes flow control valve 48. With pressurized fluid by-passing flow control valve 48, the actuation of the flow control valve to a closed position by axial movement of inertia disc 62 and plunger 91 of dumping valve 83 will not effect discontinuance of the operation of motor 13.

*Modification*

In FIGS. 10 to 13, inclusive, another embodiment of the present invention is illustrated. The impact power tool 10A shown in FIGS. 10 to 13 basically differs from the impact power tool 10 in that the torsion means, such as torsion bar 114, is of smaller diametral dimensions than torsion bar 19 of the embodiment shown in FIGS. 1, 6, and 7 because the driving torque of the fluid motor is not transmitted to the hammer through the torsion bar as in the embodiment of FIGS. 1, 6, and 7. In impact tool 10A the rotor of the fluid motor is directly connected to the hammer to rotate the latter. In the embodiment shown in FIGS. 10 to 13, parts of impact tool 10A corresponding to like parts of impact tool 10 shown in FIGS. 1, 6, and 7 will be designated by the same reference number with the suffix A added thereto.

Figure 10:
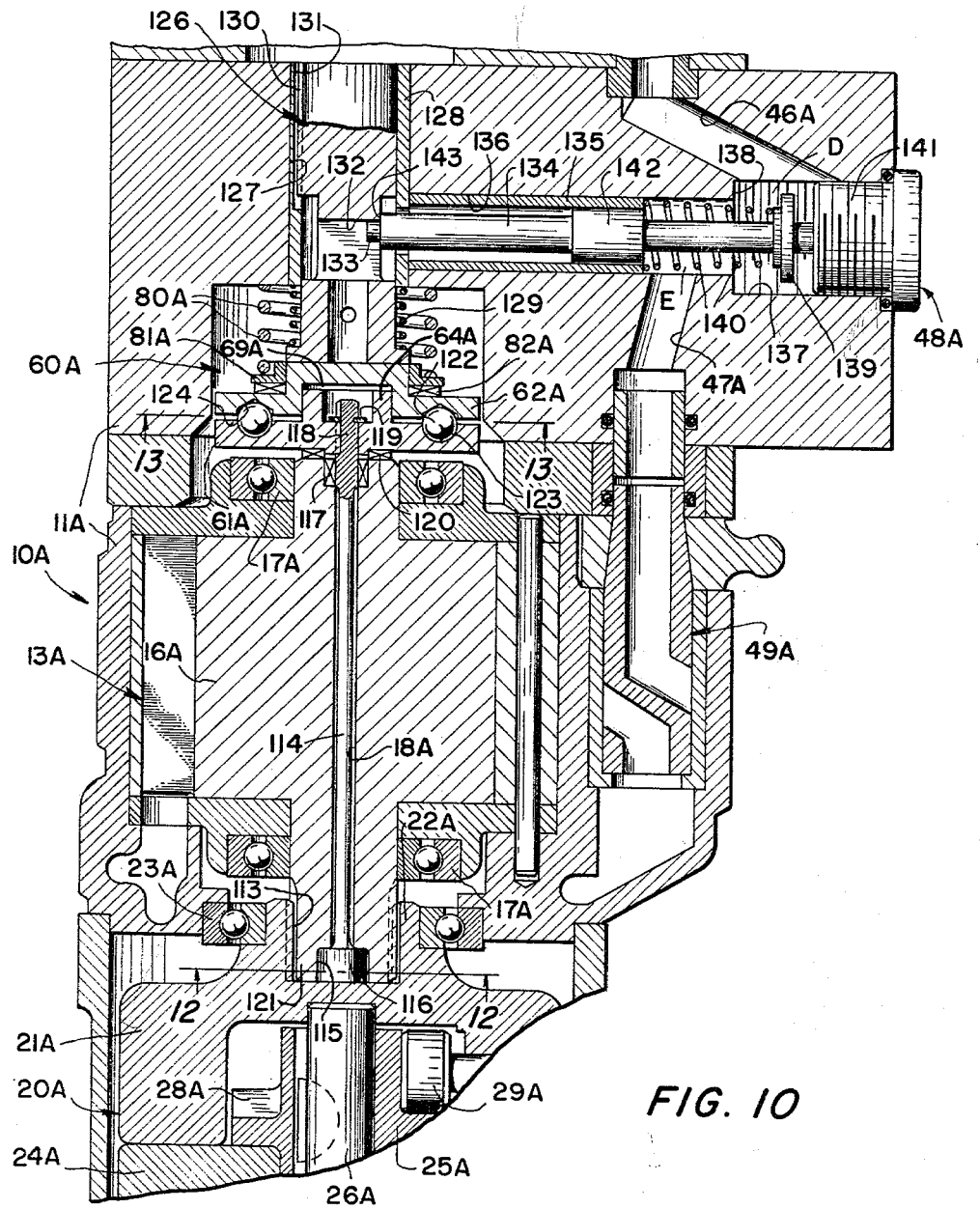
FIG. 10 is a fragmentary view in section of another embodiment of the torque control mechanism according to this invention.

As shown in FIG. 10, impact power tool 10A comprises a hammer assembly 20A similar to that described in impact power tool 10, which assembly includes a hammer 21A and a hammer dog 24A. As in impact tool 10, hammer dog 24A is intermittently axially thrown forward into rotative alignment with the anvil jaws of an anvil (not shown) so that the hammer dog jaws impact against the anvil jaws. Axial forward movement of hammer dog 24A is achieved by means of a cam member 25A which is engaged by a cam follower 29A carried by hammer 21A.

A fluid motor 13A, similar in construction to motor 13, is supported in the casing or housing 11A of impact tool 10A in the same manner as disclosed with respect to impact tool 10. The rotor 16A of motor 13A is provided with a splined forward end portion 121 which is receivable in a splined axial recess 113 in hammer 21A to transmit rotation of motor 13A to hammer 21A. Rotor 16A of motor 13A, similar to rotor 16 of impact tool 10, is provided with an axial bore 18A which is adapted to receive therethrough a torsion bar 114. The forward end of bore 18A is counterbored at 115 to receive an enlarged head end portion 116 of torsion bar 114. Head end portion 116 is secured within counterbore 115 in any suitable manner, as by welding, soldering, swaging, or the like, so that head end portion 116 of torsion bar 114 rotates with rotor 16A and hammer 21A. The rear end portion of bore 18A is also counterbored to receive a bearing 117 which supports the enlarged rear end portion 118 of the torsion bar for rotation relative to motor rotor 16A. Torsion bar 114 is of such a length that the rear end portion 118 of torsion bar 114 projects beyond bore 18A.

As in impact tool 10, a mass means 60A is connected to the rear end portion 118 of torsion bar 114. Mass means 60A comprises a cam disc 61A and an inertia disc 62A. Cam disc 61A is suitably secured to end portion 118 of torsion bar 114 as by a spline formed in an axial bore in cam disc 61A, which spline engages a longitudinal slot formed in the surface of end portion 118. A retaining ring 119 is secured to the torsion bar and in abutment against cam disc 61A to prevent endwise or axial movement of the cam disc relative to the torsion bar. A thrust bearing 120 is disposed between the end of rotor 16A and cam disc 61A to reduce frictional contact between the rotor and cam disc.

Cam disc 61A has a tubular hub portion 64A which is slidably receivable in the recess 69A formed by the central cup-shaped portion of inertia disc 62A to thereby support the inertia disc for rotation and axial slidable movement relative to cam disc 61A.

To provide conjoined rotation of inertia disc 62A and cam disc 61A and axial movement of inertia disc 62A relative to the cam disc, a plurality of circumferentially spaced balls 122 are carried in semi-spherical depressions or sockets 123 in the rear face of the cam disc, which balls extend into adjacent depressions or sockets in the forward faces of inertia disc 62A. Inertia disc 62A is biased toward cam disc 61A by a spring 80A which is disposed to abut at one end a pressure ring 81A and at the opposite end abut the end wall of the cavity formed in housing 11A to receive mass means 60A. Pressure ring 81A is mounted on the outer surface of the cup-shaped hub portion of inertia disc 62A and rides on needle bearing 82A which is disposed between the rear face of inertia disc 62A and pressure ring 81A.

In place of the dumping valve 83 shown in the embodiment illustrated in FIGS. 1, 6, and 7, a plunger 126 is slidably disposed in a bore 127 formed in housing 11A and lined by a sleeve 128. Plunger 126 is biased in a forward direction by a spring 129 so that the forward end of plunger 126 is maintained in abutment against the rear end wall of the cup-shaped portion of inertia disc 62A. Plunger 126 is prevented from rotating by a longitudinal tongue 130 which rides in a longitudinal groove 131 in sleeve 128. Approximately midway between the ends of plunger 126, the plunger is of reduced diameter and has a slot 132 extending through the reduced diameter portion. The slot 132 is adapted to receive therein a piston stem 134 of a flow control valve 48A.

Figure 11:
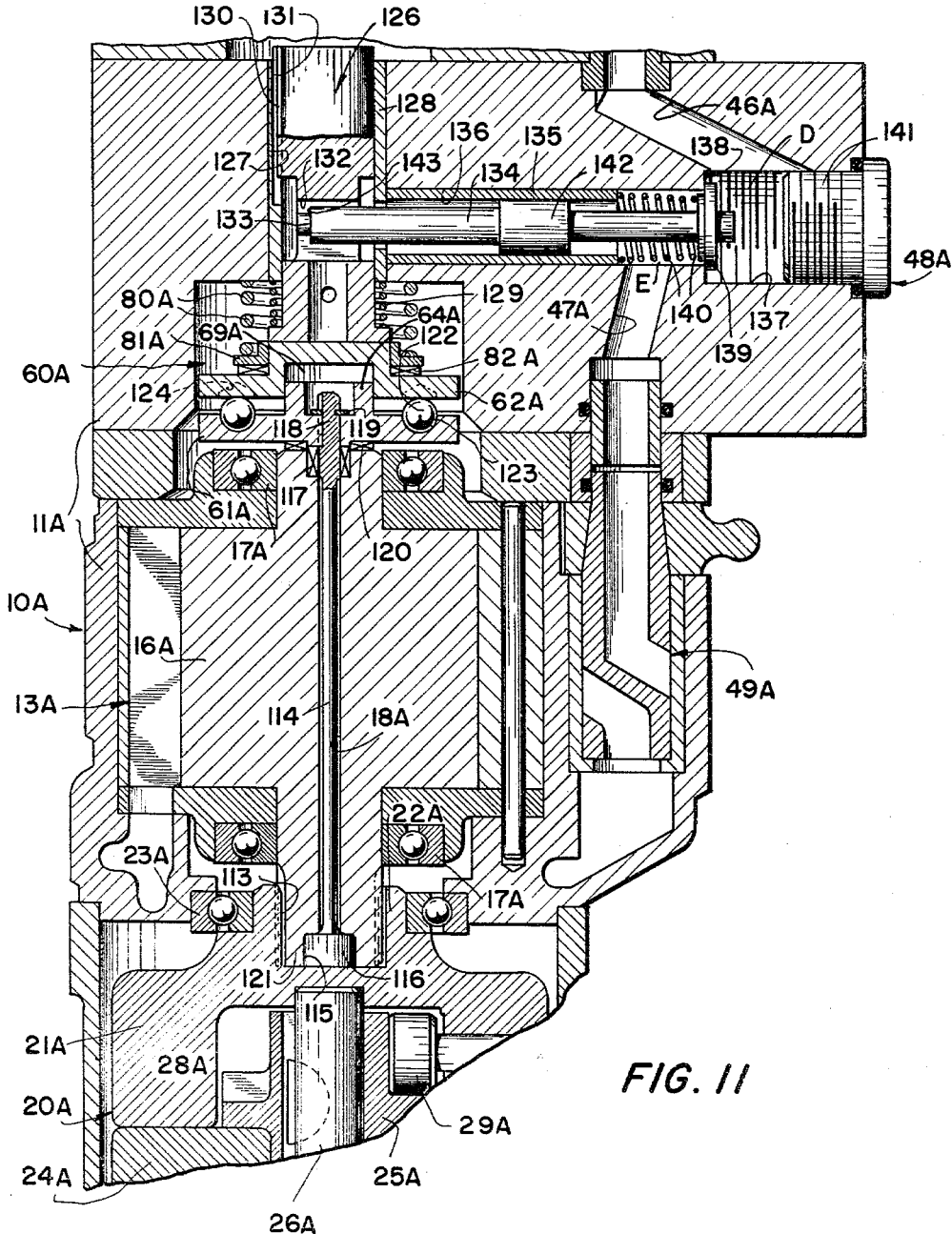
FIG. 11 is a view similar to FIG. 10 having another operative position of the torque control mechanism.
Figure 12:
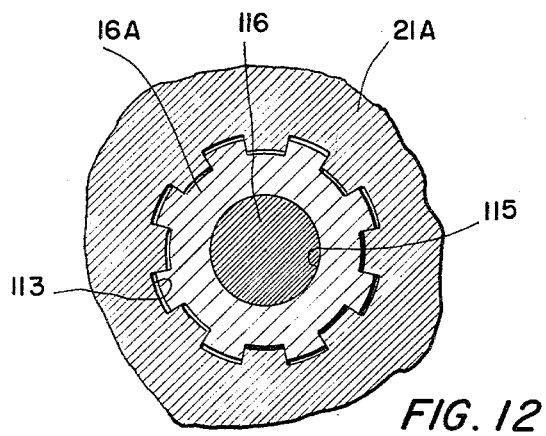
FIG. 12 is a transverse sectional view taken along line 12—12 of FIG. 10, looking in the direction of the arrows.
Figure 13:
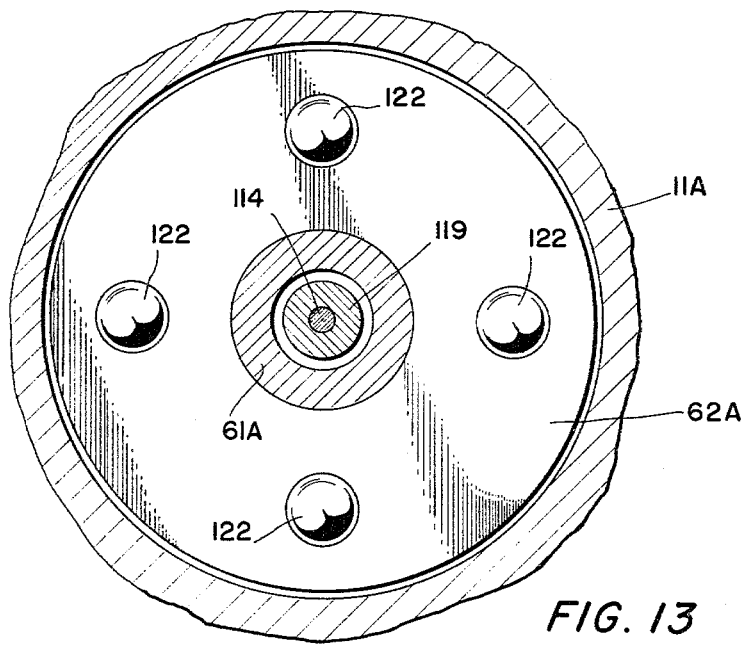
FIG. 13 is a transverse sectional view similar to FIG. 12 but viewed in an opposite longitudinal direction as indicated by the line 13—13 of FIG. 10.

Flow control valve 48A is disposed for axial movement in a sleeve 135 which partly lines a bore 136 extending in housing 11A normal to the longitudinal axis of plunger 126. Bore 136 at its outer end has a counterbored portion 137 which forms an annular valve seat 138 against which the valve head 139 abuts when the flow control valve 48A is in the closed position as shown in FIG. 11. The flow control valve 48A is biased in an open position by a spring 140 which abuts at one end the end of sleeve 135 and at the opposite end, valve head 139. A threaded plug 141 is turned into the threaded counterbored portion 137 of bore 136 so that a chamber D is defined between the plug and valve seat 138. Another chamber E is formed between valve seat 138 and an enlarged diameter portion 142 of piston stem 134. Portion 142 of piston stem 134 is of such a diameter as to snugly fit within sleeve 135. In the position shown in FIG. 10, flow control valve 48A is held in an open position by the abutment of the annular shoulder 143, formed by reduced end portion 133 of piston stem 134, and the end of slot 132 of plunger 126. Valve head 139 serves to control flow of pressurized fluid between chamber D and chamber E. Pressurized fluid is supplied to chamber D by fluid supply passageway 46A, while chamber E is in communication with passageway 47A to provide flow of pressure fluid from chamber E. Passageway 47A conducts pressurized fluid to a reversing valve 49A, the fluid flowing from the reversing valve through suitable porting (not shown) to motor 13A. As in impact tool 10, impact tool 10A has a trigger actuated throttle valve (not shown) through which pressurized fluid flows from a source thereof to passageway 46A.

In operation of impact power tool 10A described above, when the torque load is of sufficient magnitude to cause appreciable deceleration of hammer 21A and/or rebound upon impact with the anvil (not shown), the motor and its rotor 16A will decelerate since the hammer and rotor are directly coupled together for conjoined rotation. Deceleration of hammer 21A will also cause the enlarged head end portion 116 of torsion bar 114 to likewise decelerate. Upon deceleration of hammer 21A, which rate of deceleration is directly proportional to the torque load, the mass means 60A, by reason of its inertia of rotation, will continue to rotate and will rotationally override hammer 21A and rotor 16A. Since mass means 60A, through cam disc 61A, is connected to torsion bar end portion 118, the overriding of the mass means will cause torsion bar 114 to twist. When the inertial energy of the mass means is absorbed in the twisting of the torsion bar, the torsion bar will untwist and rotate the mass means in the opposite direction, rotation of cam disc 61A being transmitted to inertia disc 62A through sockets 123 and 124 in the respective discs and balls 122. When the torsion bar has untwisted and again rotates with motor rotor 16A and hammer 21A, inertia disc 62A will continue to rotate by reason of the inertia of rotation imparted to it by the untwisting of torsion bar 114 and will be cammed axially rearwardly by balls 122 riding out of sockets 124 in inertia disc 62A as shown in FIG. 11. Axial displacement of inertia disc 62A will occur only when the rotational inertia imparted to inertia disc 62A by the untwisting of torsion bar 114 is sufficient to overcome the force of spring 80A to thereby permit the balls to ride out of sockets 124. Since magnitude of the rotational inertia imparted to the inertia disc by the untwisting of torsion bar 114 is dependent upon the amount of twist imposed on the torsion bar which, in turn, is directly proportional to the rate of deceleration of hammer 21A and the latter proportional to torque load, the inertia disc will be cammed axially only when the torque load reaches a value for which the torque control mechanism has been preset.

When a predetermined torque load is reached and inertia disc 62A is moved axially rearwardly, the inertia disc moves plunger 126 axially rearwardly as shown in FIG. 11. Rearward movement of plunger 126 removes the end of slot 132 from abutment with annular shoulder 143 on piston stem 134. With the disengagement of the end of slot 132 and shoulder 143, piston stem 134 is moved axially to the closed position shown in FIG. 11 under the urging of fluid pressure acting against the surface enlarged portion 142 of piston stem 134, which hydrostatic force is greater than the force of spring 140 acting in the opposite direction. With valve head 139 seated against valve seat 138 flow of pressurized fluid from chamber D to chamber E is stopped, thereby ceasing operation of motor 13A. The valve head 139 remains closed by virtue of fluid pressure acting against the under surface of valve head 139 as long as the throttle valve (not shown) remains open. When the throttle valve is allowed to close, thus stopping the flow of pressure fluid through passageway 46A and into chamber D, the pressure fluid in chamber D and passageway 46A bleeds off so that spring 140 axially moves piston stem 134 to the valve open position as shown in FIG. 10. With the withdrawal of piston stem 134 from slot 132 in plunger 126, spring 129 axially moves plunger 126 into abutment with inertia disc 62A and the end of slot 132 into engagement with annular shoulder 143 of piston stem 134. When the throttle valve (not shown) is again actuated to an open position to admit pressurized fluid into passageway 46A and chambers D and E, the fluid pressure in chamber E exerts a biasing force on the enlarged portion 142 of piston stem 134 in a direction to seat valve head 139 against valve seat 138. This hydrostatic biasing force conditions the flow control valve 48A so that, upon release of piston stem 134 by movement of plunger 126, the flow control valve will move to a closed position as previously explained and as shown in FIG. 11.

It is believed that it is now readily apparent that the present invention provides a novel torque control mechanism for impact power tools, which mechanism is capable of accurately measuring or sensing torque loads and, upon a predetermined torque load, automatically ceasing operation of the motor of the impact tool. It is a mechanism which does not appreciably add to the size and weight of an impact tool.

Although two embodiments of the invention have been illustrated and described in detail, it is to be expressly understood that the invention is not limited thereto. Various changes can be made in the arrangement of parts without departing from the spirit and scope of the invention, as the same will now be understood by those skilled in the art.

I claim:

1. In a pneumatic power tool having an air motor and a hammer means which is constructed and arranged to deliver intermittent rotary impact blows on an anvil, a torque control mechanism comprising
   (a) an elongated torsion means disposed coaxially within said air motor and connected at one end for conjoined rotation with the hammer means and at the opposite end free to rotate relative to the hammer means,
   (b) mass means connected to said free end of said torsion means to cause the torsion means to twist upon impact and deceleration of the hammer means,
   (c) said mass means including cam means and inertia means,
   (d) said inertia means being subject to rotative acceleration upon untwisting of said torsion means and free to override said torsion means after the latter has untwisted,
   (e) said cam means cooperating with said inertia means to force the inertia means to move axially when the latter overrides the torsion means, and
   (f) valve control means for controlling flow of pressurized air to said motor disposed to be engaged by said inertia means when axially moved and actuated to effect cessation of operation of the motor.

2. The apparatus of claim 1 wherein said valve control means comprises a valve biased in a direction to be closed, by the action of pressurized air on said valve, and a plunger, said plunger disposed to engage said valve and hold the latter open and slidable to release said valve and allow the latter to close.

3. The apparatus of claim 1 wherein said valve control means comprises a normally open valve, a biasing means urging said valve towards a closed position when said motor is operating, said valve having a pressure chamber associated therewith to receive pressure fluid to hold the valve in an open position against said biasing means, and a plunger controlled valve normally closed to prevent pressure fluid from passing from said chamber, said plunger controlled valve disposed to be actuated by said inertia means to an open position and thereby release pressure fluid from said chamber and cause said valve to close under the urging of said biasing means.

4. The apparatus of claim 1 wherein said valve control means comprises a fluid pressure piston type valve and a dumping valve cooperating with the inertia means and the fluid pressure piston type valve to provide an imbalance of forces acting on the piston type valve to close the same when said inertia means moves axially to open said dumping valve.

5. In an impact tool having a motor including a tubular rotor, an anvil and a hammer assembly driven by said motor and constructed and arranged to periodically impact against said anvil to rotate the latter, a torque control mechanism comprising
   (a) a torsion bar disposed coaxially in said tubular rotor and connected at one end for conjoined rotation with said hammer assembly and at the opposite end free to rotate relative to the hammer assembly when the hammer assembly impacts and decelerates,
   (b) mass means connected to the free end of said torsion bar to rotate with the latter and override the hammer assembly when it decelerates upon impact with the anvil and thereby twist the torsion bar, and
   (c) a motor control means for controlling the operation of said motor,
   (d) said mass means including an actuating means axially slidable to effect actuation of said motor control means to effect cessation of operation of the motor.

6. The apparatus of claim 5 wherein said torsion bar is connected at one end to the hammer and at the opposite end connected to the rotor and the torsion bar is of sufficient rigidity to transmit rotation of the rotor to said hammer means prior to impact of the latter with the anvil.

7. The apparatus of claim 5 wherein said rotor is directly connected to the hammer means to rotate the same and the torsion bar is connected at one end to the rotor and at the opposite end is free to rotate relative to the rotor.

8. A pneumatic impact tool comprising
   (a) a housing,
   (b) an air motor disposed in said housing,
   (c) a hammer assembly of the cam engaged-spring disengaged type disposed adjacent said motor,
   (d) an anvil disposed adjacent said hammer assembly to receive intermittent rotative impacts from said hammer assembly,
   (e) said motor having a tubular rotor,
   (f) an elongated torsion bar coaxially disposed to extend through said tubular rotor and connected at one end to said hammer assembly for conjoined rotation with the latter and at the opposite free end to rotate relative to the hammer assembly upon impact and deceleration of the hammer assembly,
   (g) a cam disc connected to the free end of said torsion bar for conjoined rotation therewith,
   (h) an inertia disc mounted on said cam disc for axial movement relative to the latter,
   (i) connecting means cooperating with the cam disc and the inertia disc to provide in one phase of operation for conjoined rotation of the cam and inertia discs upon deceleration of the hammer assembly and the twisting and untwisting of the torsion bar and in another phase of operation after untwisting of the torsion bar allowing relative rotation of the inertia disc with respect to the cam disc and causing axial movement of the inertia disc relative to the cam disc, and
   (j) a control means for controlling operation of said motor disposed for actuation by said inertia disc when it axially moves to thereby effect cessation of operation of the motor.

9. The apparatus of claim 8 wherein said connecting means comprises a plurality of pins carried by said cam disc, a recess for each pin in the surface of the inertia disc, each recess having a vertical end wall and an inclined bottom surface engaged by the pin associated with the recess.

10. The apparatus of claim 8 wherein said connecting means comprises a plurality of circumferentially spaced substantially semi-spherical recesses in the cam disc and inertia disc and a ball for each pair of recesses disposed to partially extend into each recess.

11. The apparatus of claim 8 wherein the torsion bar at one end is connected to the hammer assembly to rotatively drive the latter and at the opposite end connected to the rotor.

12. The apparatus of claim 8 wherein the rotor is connected to the hammer assembly to rotatively drive the latter and the torsion bar end adjacent the hammer assembly connected to the rotor and the end remote from the hammer assembly free to rotate relative to the rotor.

References Cited by the Examiner

UNITED STATES PATENTS

| | | | |
|---|---|---|---|
| 2,261,204 | 11/41 | Amtsberg | 173—93 |
| 2,814,277 | 11/57 | Jimerson | 173—12 |
| 3,006,446 | 10/61 | Harrison et al. | 192—30 |
| 3,018,866 | 1/62 | Elliott et al. | 192—150 |

BROUGHTON G. DURHAM, *Primary Examiner.*

MILTON KAUFMAN, *Examiner.*